US008738647B2

(12) United States Patent
Menon et al.

(10) Patent No.: US 8,738,647 B2
(45) Date of Patent: May 27, 2014

(54) METHOD AND SYSTEM FOR IMAGE MATCHING (75) Inventors: Keshav Menon, Sunnyvale, CA (US);
Max Delgadillo, Salinas, CA (US);
Sunil Ramesh, San Jose, CA (US); Gd Ramkumar, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 396 days.

(21) Appl. No.: 12/378,599

(22) Filed: Feb. 18, 2009

(65) Prior Publication Data

US 2010/0211602 A1    Aug. 19, 2010

(51) Int. Cl.
*G06F 17/30* (2006.01)
(52) U.S. Cl.
USPC ............ 707/770; 707/915; 707/966; 382/190
(58) Field of Classification Search
USPC .................. 707/705, 770, 915, 966; 382/190
See application file for complete search history.

(56) References Cited

U.S. PATENT DOCUMENTS

| | | | |
|---|---|---|---|
| 3,001,439 A | 9/1961 | Rouy | |
| 5,611,000 A | 3/1997 | Szeliski et al. | |
| 5,694,491 A | 12/1997 | Brill et al. | |
| 5,974,159 A | 10/1999 | Lubin et al. | |
| 5,983,218 A | 11/1999 | Syeda-Mahmood | |
| 6,075,905 A | 6/2000 | Herman et al. | |
| 6,307,959 B1 | 10/2001 | Mandelbaum et al. | |
| 6,446,060 B1 * | 9/2002 | Bergman et al. | 707/770 |
| 6,580,811 B2 | 6/2003 | Maurer et al. | |
| 7,072,872 B2 | 7/2006 | Caid et al. | |
| 7,109,987 B2 | 9/2006 | Goel et al. | |
| 7,894,689 B2 | 2/2011 | Liu et al. | |
| 8,037,043 B2 * | 10/2011 | Zoeter et al. | 707/705 |
| 8,126,247 B2 | 2/2012 | Chiang et al. | |
| 8,126,272 B2 | 2/2012 | Carr et al. | |
| 8,184,155 B2 | 5/2012 | Ke | |

(Continued)

FOREIGN PATENT DOCUMENTS

| | | |
|---|---|---|
| CN | 101010693 A | 8/2007 |
| CN | 101231662 A | 7/2008 |
| JP | 2004-240692 | 8/2004 |
| JP | 2006-331117 A | 12/2006 |

OTHER PUBLICATIONS

International Search Report mailed on Mar. 30, 2010, for International Application No. PCT/US10/24466, filed on Feb. 17, 2010, 2 pages.

(Continued)

*Primary Examiner* — Robert Beausoliel, Jr.
*Assistant Examiner* — Alexandria Bromell
(74) *Attorney, Agent, or Firm* — Novak Druce Connolly Bove + Quigg LLP (57) ABSTRACT The present invention provides a method and system for image matching. The method includes receiving a query image at a query-server. Further, the method includes, sending a request to one or more image-matching servers of a set of distributed image-matching servers to conduct an image-search corresponding to the query image. Furthermore, the method includes receiving at the query-server, a list of identified matches from the image-matching servers corresponding to the query image, wherein the list of matches is identified based on the image-search at the image-matching servers. Moreover, the method includes selecting one or more matches from the list of identified matches based on a score corresponding to the identified matches.

13 Claims, 4 Drawing Sheets

(56) References Cited

U.S. PATENT DOCUMENTS

| | | | |
|---|---|---|---|
| 8,214,387 B2* | 7/2012 | King et al. ............... 707/770 |
| 8,406,507 B2 | 3/2013 | Ruzon et al. |
| 2002/0181745 A1 | 12/2002 | Hu |
| 2004/0088291 A1 | 5/2004 | Matsuzaki et al. |
| 2005/0002571 A1 | 1/2005 | Hiraga et al. |
| 2005/0271304 A1* | 12/2005 | Retterath et al. ........... 382/305 |
| 2006/0045348 A1* | 3/2006 | Kiros et al. ............... 382/190 |
| 2006/0262976 A1* | 11/2006 | Hart et al. ............... 382/190 |
| 2007/0047767 A1 | 3/2007 | Watabe |
| 2007/0172117 A1* | 7/2007 | Wong ........................ 382/162 |
| 2008/0060034 A1 | 3/2008 | Egnal et al. |
| 2008/0095448 A1* | 4/2008 | Ono et al. ................. 382/209 |
| 2008/0240618 A1 | 10/2008 | Chen et al. |
| 2008/0298718 A1 | 12/2008 | Liu et al. |
| 2008/0304753 A1 | 12/2008 | Sohma et al. |
| 2009/0100050 A1* | 4/2009 | Erol et al. ................... 707/5 |
| 2009/0254543 A1 | 10/2009 | Ber et al. |
| 2010/0166309 A1* | 7/2010 | Hull et al. ................. 382/176 |
| 2012/0072110 A1 | 3/2012 | Venkatraman |
| 2012/0114249 A1* | 5/2012 | Conwell .................... 382/190 |

OTHER PUBLICATIONS

"European Search Report dated Jun. 6, 2013", European Application No. 10744249.3, Jun. 6, 2013, 5 pages.

"Final Office Action dated May 14, 2013", Japanese Application No. 2011-551189, May 14, 2013, 4 pages.

"First Office Action dated Feb. 1, 2013", Chinese Application No. 201080008793.1, Feb. 1, 2013, 24 pages.

"International Search Report and Written Opinion dated Mar. 30, 2010", International Application No. PCT/US2010/024466, Mar. 30, 2013, 6 pages.

"Non Final Office Action dated Jan. 8, 2013", Japanese Application No. 2011-551189, Jan. 8, 2013, 5 pages.

Berretti, Stefano et al., "Merging Results for Distributed Content Based Image Retrieval", Multimedia Tools and Applications, Kluwer Academic Publishers, vol. 24; No. 3, Dec. 1, 2004, pp. 215-232.

Wang, Yizhou et al., "Object Recognition Using Multi-View Imaging", Signal Processing, ICSP 2008, Ninth International Conference on IEEE, Piscataway, New Jersey, Oct. 26, 2008, pp. 810-813.

Zheng, Yu et al., "Distributed Architecture for Large Scale Image-Based Search", Multimedia and Expo, 2007 IEEE International Conference, Jul. 1, 2007, pp. 579-582.

"International Search Report dated Mar. 2, 2010", International Application No. PCT/US2010/020943, 14 pages.

"Non Final Office Action dated Apr. 17, 2012", U.S. Appl. No. 12/321,235, Apr. 17, 2012, 6 pages.

"Non Final Office Action dated May 7, 2012", U.S. Appl. No. 12/319,992, 19 pages.

"Non Final Office Action dated Jun. 6, 2012", U.S. Appl. No. 12/321,235, Jun. 6, 2012, 29 pages.

"Notice of Allowance dated Oct. 26, 2012", U.S. Appl. No. 12/319,992, 7 pages.

"Notice of Allowance dated Nov. 29, 2012", U.S. Appl. No. 12/321,235, Nov. 29, 2012, 14 pages.

"Second Office Action dated Aug. 28, 2013", China Application 201080008793.1, 22 pages.

Baatz, Georges et al., "Handling Urban Location Recognition as a 2D Homothetic Problem", http://www.inf.ethz.ch/personal/pomarc/pubs/BaatzECCV10.pdf, 14 pages.

Baumberg, Adam , "Reliable Feature Matching Across Widely Separated Views", Proceedings of Computer Vision and Pattern Recognition, vol. 1, 2000, pp. 1774-1781.

Chen, David M. et al., "City-Scale Landmark Identification on Mobile Devices", http://www.inf.ethz.ch/personal/gbaatz/papers/chen11.pdf, 8 pages.

Cheng, Liang et al., "Robust Affine Invariant Feature Extraction for Image Matching", IEEE Geoscience and Remote Sensing Letters, vol. 5, No. 2, 2008, 5 pages.

Chu, et al., "Image-guided tours: Fast-approximated sift with u-surf features", Technical report, Stanford University, Department of Electrical Engineering, 2007.

Fischler, Martin A. et al., "Random Sample Consensus: A Paradigm for Model Fitting with Applications to Image Analysis and Automated Cartography", Communications of the ACM, vol. 24, 1981, pp. 381-395.

Jia, et al, "Photo-to-Search: Using Camera Phones to Inquire of the Surrounding World", Proceedings of the 7th International Conference on Mobile Data Management (MDM '06), 2006.

Lowe, David G. , "Distinctive Image Features from Scale-Invariant Keypoints", Jan. 5, 2004, 28 pages.

Lowe, David G. , "Distinctive Image Features from Scale-Invariant Keypoints", International Journal of Computer Vision, 2004, pp. 91-110.

Philbin, James et al., "Object Retrieval with Large Vocabularies and Fast Spatial Matching", Proceedings of Computer Vision and Pattern Recognition, 2007, 9 pages.

Schmid, Cordelia et al., "Local Grayvalue Invariants for Image Retrieval", IEEE Transactions on Pattern Analysis and Machine Intelligence, vol. 19, May 5, 1997, pp. pp 530-535.

Winder, Simon A. et al., "Learning Local Image Descriptors", Proceedings of Computer Vision and Pattern Recognition, 2007.

Winder, Simon A. et al., "Learning Local Image Descriptors", Proceedings of Computer Vision and Pattern Recognition, 2007, 8 pages.

* cited by examiner

METHOD AND SYSTEM FOR IMAGE MATCHING

BACKGROUND OF THE INVENTION

The present invention relates in general to digital imaging. In particular, the invention relates to a method and system for image matching.

Image matching is a fundamental technique used in applications like computer vision, object recognition, motion tracking, 3D modeling, etc. Image matching is performed to check whether two images have the same visual content. However, the two images need not be exactly the same. For example, one image may be rotated or taken from a different viewpoint as compared to the other image, it may be a zoomed version of the other image, or there might be distracting elements in the image. Furthermore, the two images may be taken under different lighting conditions. Despite such variations in the two images, they contain the same content, scene or object. Therefore, various image matching techniques are used to match images effectively.

In an example scenario, image matching may be performed to identify one or more matches against a query image provided by a user. The query image provided by the user can be, for example an image of a movie poster, a picture of an outdoor holiday spot, a photograph of a famous personality, etc. Furthermore, a server, for example a personal computer or any data processing unit that is present in a communication network, can include a database of thousands of images from a number of sources such as magazines, posters, newspapers, the Internet, billboard advertisements, etc. The query image from the user can be matched against the images stored in the database to identify appropriate matching images corresponding to the query image.

Presently, there are service providers that help a user to identify one or more matching images for a query image. In one such case, a user may click a photograph from a communication device, for example a mobile phone with an inbuilt camera, and send it to a server for image-search.

Presently, centralized servers are used for image matching application. The database of all reference images which can be used for matching is maintained at one central server. The probability of identifying one or more correct matches for a query image depends on the number of reference images which can be used for searching and is stored at the server. However, in case of a centralized server, since a single image database is used to store all the reference images, the image-search is restricted to the single database. Also, due to limited storage space of the centralized server and given the large file size of the images, there is a restriction on the maximum number of reference images that can be stored at the centralized server. Further, a problem may arise when the number of query images received at the centralized server is more than the number of searches the centralized server can handle at a given time. The capacity of searches may be restricted due to limited hard drive space, memory, and processing speed of the centralized server. In such a situation, the query images may be queued, resulting in longer wait for a user to get one or more matching images for a corresponding query image.

SUMMARY OF THE INVENTION

An objective of the present invention is to provide a method for image matching. The method includes receiving a query image at a query-server. Further, the method includes sending a request to one or more image-matching servers of a set of distributed image-matching servers to conduct an image-search corresponding to the query image. Furthermore, the method includes receiving, at the query-server, a list of identified matches corresponding to the query image, wherein the list of matches is identified based on the image-search at the image-matching servers. Moreover, the method includes selecting one or more matches from the list of identified matches based on a score corresponding to the identified matches.

Another objective of the present invention is to provide a server for image matching. The server includes a receiver for receiving a query image. Further, the server includes an extracting module for extracting a set of feature-points from the query image. Furthermore, the server includes a split module for sending a request to one or more image-matching servers of a set of distributed image-matching servers to conduct an image-search. Moreover, the server includes a merge module configured to receive from the image-matching servers a list of identified matches corresponding to the query image, the list of matches being identified based on the image-search at the image-matching servers. The merge module is further configured to select one or more matches from the list of identified matches based on a score corresponding to the identified matches.

Yet another objective of the present invention is to provide a system for image matching. The system includes a query-server, and the query-server includes a receiver for receiving a query image. Further, the query-server includes a split module for sending a request to one or more image-matching servers of a set of distributed image-matching servers to conduct an image-search. The query-server also includes a merge module being configured to receive from the image-matching servers a list of identified matches corresponding to the query image, wherein the list of matches is identified based on the image-search at the image-matching servers. Furthermore, one or more matches from the list of identified matches are selected based on a score corresponding to the identified matches. Further, the system includes a set of distributed image-matching servers, the image-matching servers comprising an extracting module for extracting feature-points from the query image.

Yet another objective of the present invention is to provide a method and system for distributing an image-search over a number of image-matching servers in order to identify one or more matches corresponding to a query image. The image-search is conducted in an image database of the image-matching servers of a set of distributed image-matching servers.

Yet another objective of the present invention is to provide a method and system for matching a query image with a plurality of down-scaled images stored at a plurality of image databases.

BRIEF DESCRIPTION OF THE DRAWINGS

The embodiments of the present invention will hereinafter be described in conjunction with the appended drawings that are provided to illustrate and not to limit the present invention, wherein like designations denote like elements, and in which.

Skilled artisans will appreciate that the elements in the figures are illustrated for simplicity and clarity to help improve understanding of the embodiments of the present invention.

DETAILED DESCRIPTION OF THE INVENTION

Various embodiments of the present invention relate to a method and system for image matching. The image matching is done to identify one or more matches corresponding to a query image. A query image is received at a query-server. The query-server processes the query image and sends a request to one or more image-matching servers of a set of distributed image-matching servers in order to conduct an image based search. Thereafter, the query-server receives from the image matching servers a list of identified matches corresponding to the query image. The query-server then assigns a score to the list of identified matches and selects one or more matches from the list based on the score.

Figure 1:
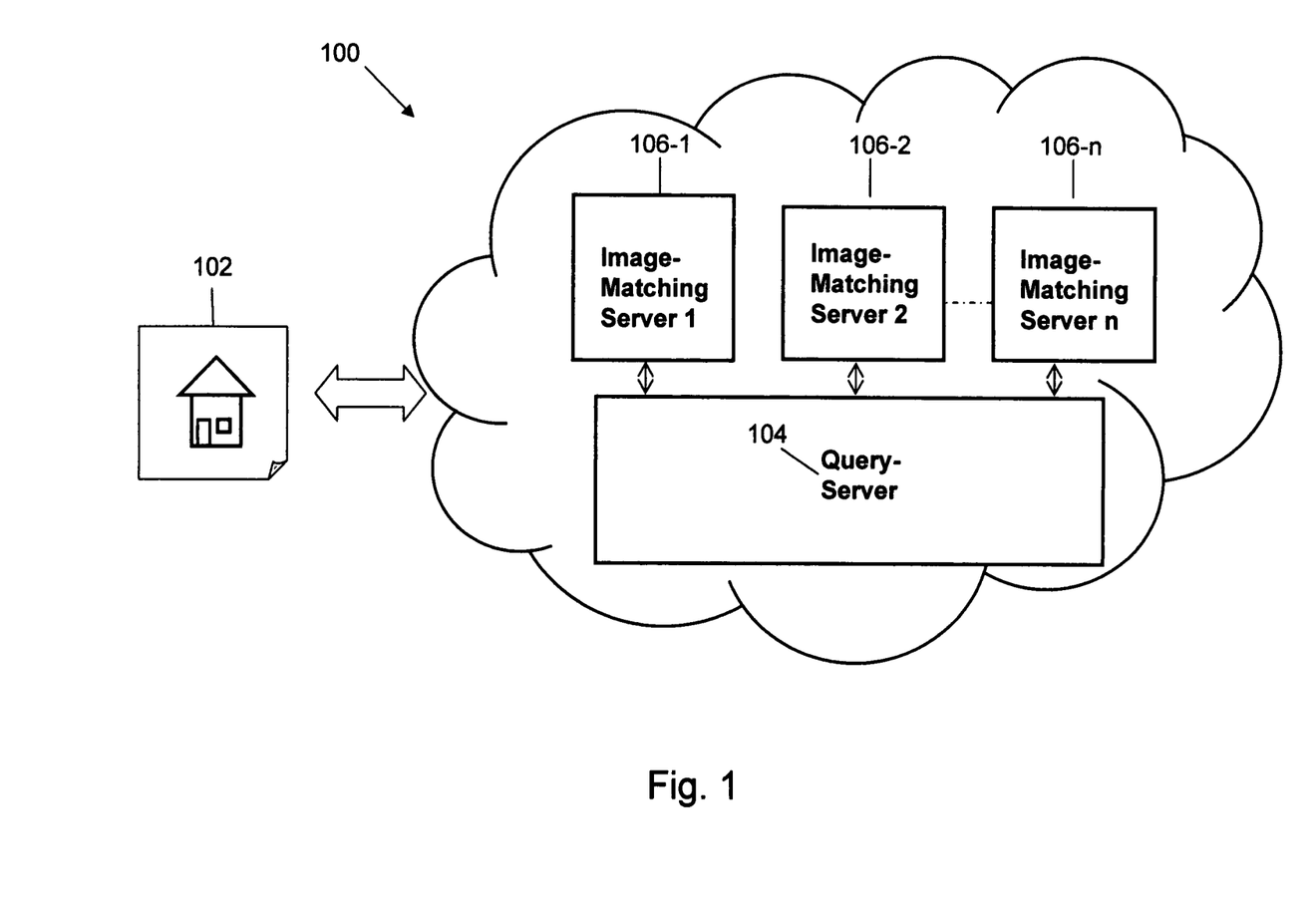
FIG. 1 illustrates an exemplary environment for image matching, where various embodiments of the present invention can be practiced.

FIG. 1 illustrates an exemplary environment 100, where various embodiments of the present invention can be practiced.

Environment 100 includes a query image 102, a query-server 104, and a set of distributed image-matching servers 106-1 to 106-n. The variable 'n' used for the image-matching servers will vary depending on the number of image-matching servers used in implementation of the present invention. The query image 102 can be in one of the standard image formats, for example, Joint Photographic Experts Group (JPEG), Graphics interchange Format (GIF), Bitmap (BMP), etc. Further, the query-image 102 may be an image of a particular product, a newspaper article, a movie poster, or any other image that can be captured through a camera or can be received or stored at a communication device.

In accordance with an embodiment of the present invention, a user can use the communication device for sending the query image 102 to the query-server 104 in order to identify one or more matching images. The communication device used for sending the query image 102 can be, for example, a mobile phone, a personal digital assistant (PDA), a personal computer or a laptop, or any other communication device capable of sending the query image 102 to the query-server 104. On receiving the query image 102 from the communication device, the query-server 104 processes and scales the query image 102 to a predefined size. Thereafter, the scaled query image 102 is sent to one or more image-matching servers of the set of distributed image-matching servers 106-1 to 106-n.

The query-server 104 and the set of distributed image-matching servers 106-1 to 106-n can be any networked data processing unit. Further, the image-matching servers of the set of image-matching servers 106-1 to 106-n include databases of a plurality of images. An image based search corresponding to the query image 102 is run at the image-matching servers 106-1 to 106-n. It will be apparent to a person ordinarily skilled in the art that one or more identified matches for the query image 102 may not be exactly the same as the query image 102, but will include the same content as that of the query image 102. For example, the one or more identified matches can be a scaled, rotated or zoomed version. An image matching algorithm is used at the image-matching servers 106-1 to 106-n to identify one or more matches of the query image 102 using the plurality of images stored at the image-matching servers 106-1 to 106-n. Further, the results of the image based search from the image-matching servers 106-1 to 106-n are sent to the query-server 104 and are combined at the query-server 104. The matches of the list of identified matches are assigned a score based on an extent of their geometric matching with the query image 102, and these are sorted in a decreasing order of the score. Lastly, the user is provided with the top three or four results of the sorted list of results that are combined at the query-server 104.

Figure 2:
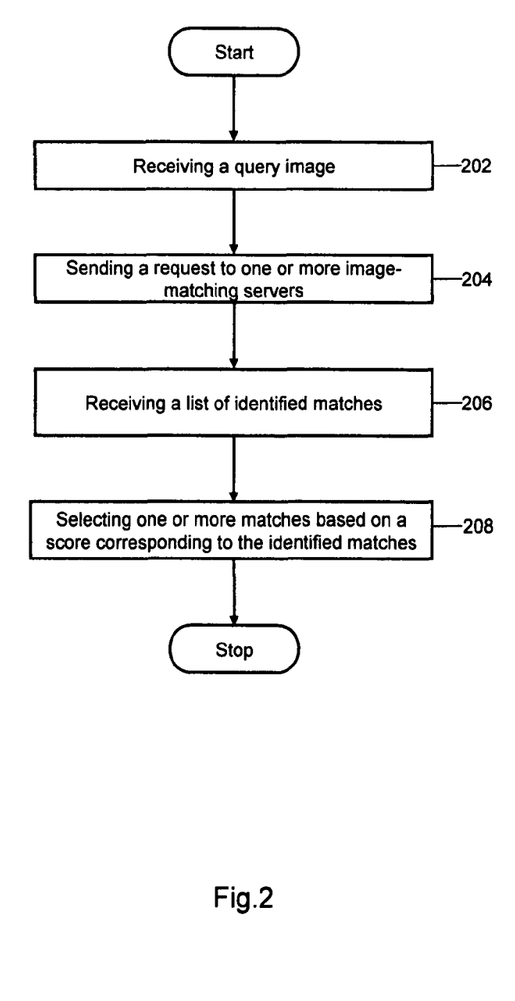
FIG. 2 is a flow diagram illustrating an exemplary method for image matching, in accordance with various embodiments of the present invention.

FIG. 2 is a flow diagram illustrating an exemplary method for image matching, in accordance with various embodiments of the present invention. A user interested in finding out one or more matching images corresponding to a query image, for example the query image 102, can send the query image 102 to the query-server 104 using a communication device. The one or more matching images can have a close resemblance to the query image 102 in terms of content and/or context of the query image 102. Further, the query image 102 can be sent from the communication device to the query-server 104 using any standard communication protocol, for example, Hyper-Text Transfer Protocol (HTTP), Simple Mail Transfer Protocol (SMTP), File Transfer Protocol (FTP), and the like.

At step 202, the query image 102 is received by the query-server 104. The query image 102 is then processed and scaled to a predefined size at the query-server 104. In one example, the predefined size can be a thumbnail size of the query image 102. In another example, the query image 102 is down-scaled to a predefined size in order to match the down-scaled query image 102 with a plurality of down-scaled images stored at image databases of the matching servers 106-1 to 106-n. At step 204, the query-server 104 sends a request to one or more of the image-matching servers of the set of distributed image-matching servers 106-1 to 106-n to conduct an image-search corresponding to the query image 102. For one embodiment, prior to performing step 204, the query-server 104 can extract a set of feature-points from the query image 102. The set of feature-points is used to match with a set of feature-points associated with a plurality of images stored at the image-matching servers 106-1 to 106-n. Feature-points are a set of 'interesting points' used to represent an image. To identify the feature-points in the image, the 'interestingness' of the points in the image is calculated by a predefined method. These feature-points are robust to changes in image rotation, scale, viewpoint, or lighting conditions. Furthermore, one or more images can be determined to be a match when a sufficient number of feature-points corresponding to the two images match both visually and geometrically. In accordance with this embodiment, the request can include the set of extracted feature-points from the query image 102. For another embodiment, the set of feature-points corresponding to the query image 102 is extracted separately at one or more image-matching servers of the distributed image-matching servers 106-1 to 106-n. In accordance with this embodiment, the request can include the scaled image corresponding to the query image 102.

Further, based on the set of extracted feature-points, the image-matching servers of the set of distributed image-matching servers 106-1 to 106-n conducts the image-search within the plurality of images stored at their database. The image-search is based on matching the set of feature-points associated with the plurality of images with the set of feature-points extracted from the query image 102. This aspect of the invention is described in detail in conjunction with FIGS. 3 & 4. As a result of the image-search, at step 206, the query-server 104 receives from the distributed image-matching servers 106-1 to 106-n a list of identified matches corresponding to the query image 102.

Thereafter, the query-server 104 assigns a score based on an extent of geometric matching of the query image 102 with the list of identified matches received from the set of distributed image-matching servers 106-1 to 106-n. Basically, the score is assigned on the basis of the extent of matching of an identified image corresponding to the query image 102. For one embodiment, the Random Sample Consensus (RANSAC) algorithm can be used for scoring the list of identified matches, although other variants of RANSAC-like algorithms or other statistical algorithms can also be used. Typically, algorithms for scoring the list of identified matches are based on feature vectors corresponding to the query image 102 and the list of identified matches. The feature vectors can be derived from the set of feature-points extracted from an image. Feature vectors corresponding to the two images being matched that are close to each other are visually similar, and the corresponding feature-points are called putative correspondences or 'correspondences'. In accordance with the RANSAC algorithm, a small set of putative correspondences is randomly sampled. Thereafter, a transformation is generated using these sampled correspondences. After generating the transformation, the putative correspondences that fit the image-matching model formed by the sampled correspondences are determined. The putative correspondences that fit the image-matching model are geometrically consistent and called 'inliers.' Thereafter, the total number of inliers corresponding to one of the identified matches and the query image 102 that is being matched is determined. The above steps are repeated for successive images in the list of identified matches until the number of repetitions/trials is greater than a predefined threshold limit or the number of inliers for one or more images from the list of identified matches being matched is sufficiently high to determine a match between the images in the list of identified matches and the query image 102. Based on this, the RANSAC algorithm returns the highest number of inliers corresponding to the image-matching model for the list of identified matches. Thereafter, the list of identified matches is scored based on the number of inliers identified for the images in the list of identified matches. For example, the image from the list of identified matches having the maximum number of inliers corresponding to the query image 102 is assigned a highest score and so on for other images in the identified list. For another embodiment, scoring of the identified matches is performed based on the area of the identified image covered by the inliers that is being matched corresponding to the query image 102. For example, two identified matches can have the same number of inliers corresponding to the query image. However, one identified match can have all the inliers concentrated at one corner of the image, whereas the other identified match can have the inliers spread out throughout the image. In this case, the two identified matches will have different scores, even though they have the same number of inliers.

At step 208, one or more matches from the list of identified matches are selected based on the score assigned to the identified matches. For one embodiment, before selecting one or more matches from the list of identified matches, the list of identified matches is sorted in a decreasing order of the assigned score. Further, the best possible matching image corresponding to the query image 102, obtained through the image-search, will be assigned a highest score and will be on the top in the sorted list, and the images that do not look similar to the query image 102 will be at a lower place in the sorted list.

Figure 3:
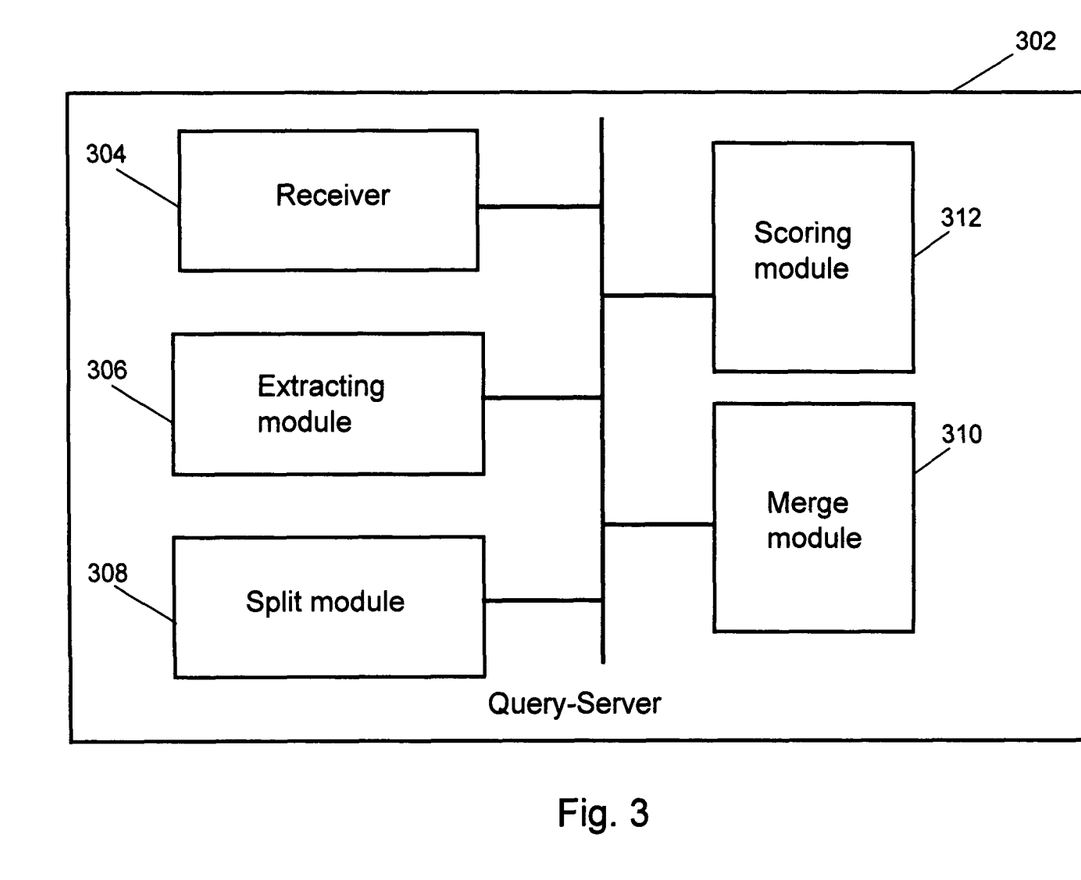
FIG. 3 is an exemplary block diagram illustrating a query-server, in accordance with various embodiments of the present invention.

FIG. 3 is a block diagram illustrating a query-server 302, in accordance with various embodiments of the present invention. The query-server 104 is structurally and functionally similar to the query-server 302. The query-server 302 includes a receiver 304, an extracting module 306, a split module 308, a merge module 310, and a scoring module 312. The receiver 304 is used to receive and scale the query image 102 to a predefined size. The extracting module 306 is used to extract the set of feature-points corresponding to the query image 102. Furthermore, the split module 308 is used to send a request to one or more of the image-matching servers 106-1 to 106-n. For one embodiment, the request can be sent to one or more image-matching servers 106-1 to 106-n to conduct the image-search concurrently, i.e., each image-matching server of the distributed image-matching server 106-1 to 106-n receives the request and starts the image-search at the same time. As described in conjunction with FIG. 2, the request can include either a set of, feature-points extracted from the query image 102 by the extracting module 306 or the scaled query image 102.

In case the request includes the scaled query image 102, the image-matching servers 106-1 to 106-n may have to extract the set of feature-points corresponding to the query image 102 before starting the image-search. It will be apparent to a person ordinarily skilled in the art that in this case, the query-server 302 will not include the extracting module 306, and it will be present in the image-matching servers 106-1 to 106-n.

The image-search is conducted within the plurality of images stored in image databases of the image-matching servers 106-1 to 106-n. In case one or more matches are identified corresponding to the query image 102 at any of the image-matching servers 106-1 to 106-n, the corresponding image-matching server sends the list of identified matching images to the query-server 302. For one embodiment, as soon as one of the image-matching servers 106-1 to 106-n identifies one or more matching images corresponding to the query image 102, the image-search at all the image-matching servers 106-1 to 106-n is stopped. In accordance with this embodiment, since the matching images from any one image-matching server is provided to the user, the image matching algorithm performs a very high tolerance check for identifying the matching images. Further, the identified results are provided to the merge module 310 of the query-server 302 for sorting.

On receiving the list of identified matches from the set of distributed image-matching servers 106-1 to 106-n, the scoring module 312 assigns a score to the identified matches. The scoring of the list of identified matches has been explained in detail in conjunction with FIG. 2. Further, based on the scoring of the list of identified matches, one or more matches from the list of identified matches are selected by the merge module 310. In case two image-matching servers identify the same image as the match corresponding to the query image 102, the scoring module 312 assigns the same score to the identified matches. Further, a predefined scoring function is used to assign the score corresponding to the identified matches.

Figure 4:
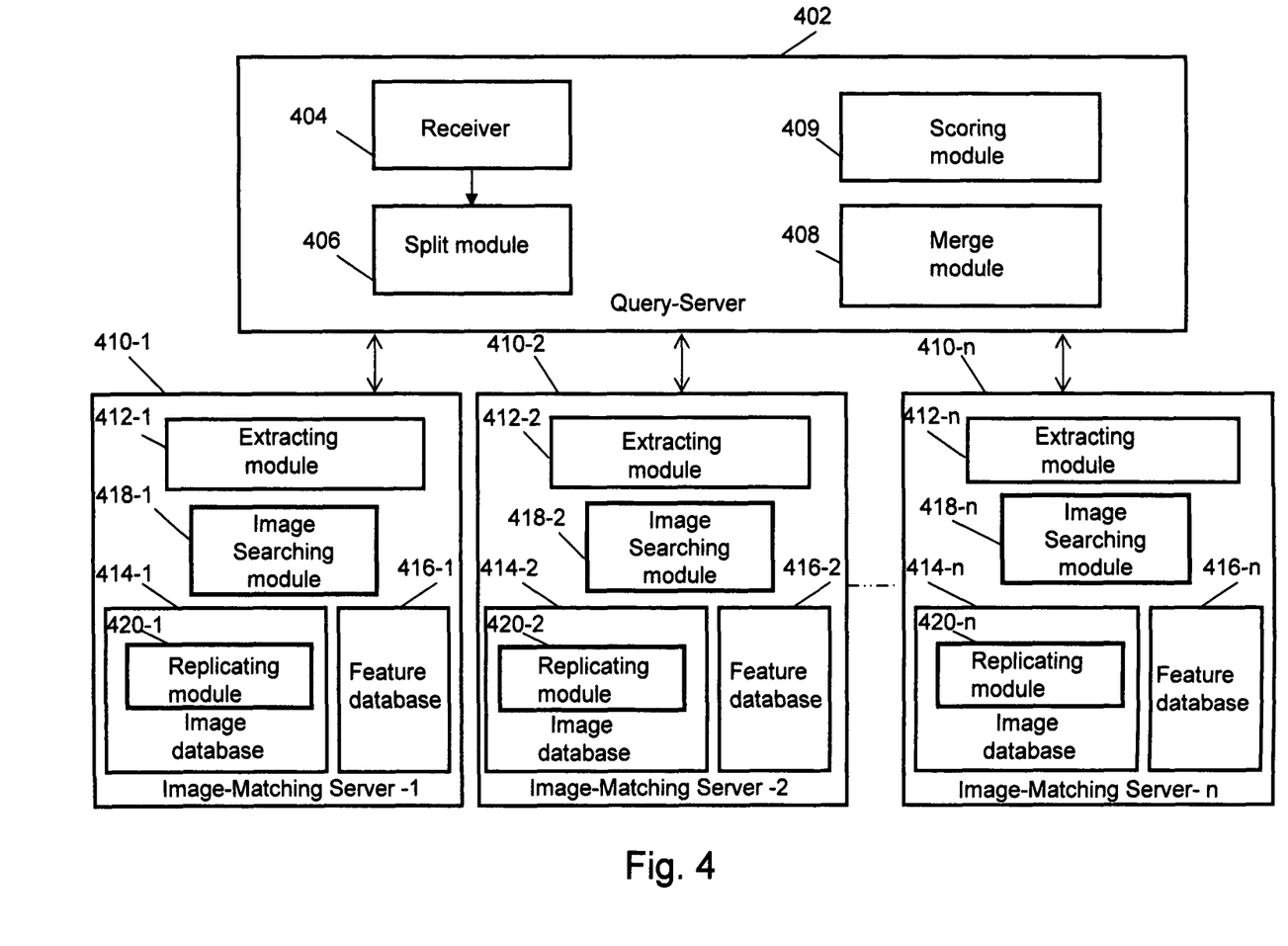
FIG. 4 is an exemplary block diagram illustrating an image matching system, in accordance with various embodiments of the present invention.

FIG. 4 is a simplified and representative block diagram illustrating an image matching system, in accordance with various embodiments of the present invention. FIG. 4 includes a query-server 402, which is structurally and functionally similar to the query-servers 104 and 302. The query-server 402 includes a receiver 404, a split module 406, a merge module 408, and a scoring module 409. Further, the image matching system includes a set of distributed image-matching servers 410-1 to 410-n. The image-matching servers 410-1 to 410-n are structurally and functionally similar to the image-matching servers 106-1 to 106-n. One or more image-matching servers of the set of distributed image-matching servers 410-1 to 410-n include an extracting module, an image database, and a feature database. For all the image-matching servers 410-1 to 410-*n*, the extracting module has been collectively labeled as extracting modules 412-1 to 412-*n*. Similarly, the image database has been collectively labeled as image databases 414-1 to 414-*n*, and the feature database has been collectively labeled as feature databases 416-1 to 416-*n*. The variable 'n' used for the image-matching servers and its components will vary depending on the number of image-matching servers used in implementation of the present invention.

As described in conjunction with FIG. 2, the extracting modules 412-1 to 412-*n* are used to extract feature-points corresponding to the query image 102. Further, the image databases 414-1 to 414-*n* includes a plurality of images. The plurality of images can be selected from a number of sources, such as magazines, posters, newspapers, the Internet, billboard advertisements, etc. For one embodiment, each image of the plurality of images can be down-scaled to a pre-determined size before storing at the image databases 414-1 to 414-*n*. The query image 102 received at the image-matching servers 410-1 to 410-*n* is matched with the down-scaled images stored at the corresponding image databases 414-1 to 414-*n*. For one embodiment, in case an image-matching server cannot find one or more matching images within the down-scaled images, the query image 102 is matched with normal sized images (i.e. without downscaling).

The image-matching servers used for storing the plurality of images and a set of feature-points associated with the plurality of images have limited storage capacity. Consequently, there is a limit to the number of images and the set of feature-points that can be stored at an image database of the image-matching server. For one embodiment, each of the image databases 414-1 to 414-*n* can be assigned a subset for the plurality of images and the set of feature-points associated with the plurality of images that can be stored at the set of distributed image-matching servers 410-1 to 410-*n*. The subset can be assigned on the basis of the number of images and a set of feature-points associated with the images which can be stored at the image databases 414-1 to 414-*n*. For example, if there are three servers of capacity 10 Giga Byte (GB), 20 GB and 30 GB, a set of ten million images and the set of feature-points associated with the images can be distributed over three subsets of images corresponding to the three image databases in the ratio of 1:2:3. Also, for another case, the images can be evenly distributed over the three image databases so that each image database contains an equal number of images. It will be apparent to a person ordinarily skilled in the art that based on the storage capacity of an image-matching server and/or the number of images required to be stored at the image databases 414-1 to 414-*n*, numerous other combinations for the formation of subsets is possible.

For another embodiment, the subset of images can be stored within one of the image databases 414-1 to 414-*n* based on the number of query images received for a particular set of images. For example, one of the image databases 414-1 to 414-*n* can include, apart from other stored images, a set of images containing a recently released movie 'X'. Also, a lot of query images can be received at the query-server 402 corresponding to the movie 'X'. In such cases, the set of images stored at the image databases 414-1 to 414-*n* containing the movie 'X' can be assigned a particular subset. Similarly, other set of images, for which a large number of query images are received, can be assigned a particular subset within one of the image databases 414-1 to 414-*n* of an image-matching server. It will be apparent to a person ordinarily skilled in the art that based on the number of query images received for a particular set of images, numerous other subsets can be formed in the image database.

For yet another embodiment, the subset can be assigned based on the probability of receiving a large number of query images corresponding to a particular set of images in the near future. In this case, the set of images stored at one of the image databases 414-1 to 414-*n* for which a large number of query images are expected to be received can be assigned one subset. For example, before the release of a particular movie at the theatres, the probability of receiving query images corresponding to the posters of the movie, the actors in the movie, etc. is high. Based on the high probability of receiving query images corresponding to a particular set of images (movie posters and actors), a set of images containing the movie posters and actors can be assigned one subset. Further, for some cases, one of the image-matching servers 410-1 to 414-*n* having a comparably larger storage capacity can be used for storing such subsets of images in case the subset includes a large number of related images. Also, for some cases, subsets can be assigned based on past trends of receiving query images corresponding to a particular area, person, place, animal or thing, etc. In case the past trends indicate a continuous increase in the number of query images received for a particular set of images, the set of images can be assigned one subset. For example, due to an upcoming event of a movie release, if there is a continuous increase in the number of query images received for the movie, a set of images corresponding to the movie can be assigned one subset.

Image-matching servers 410-1 to 414-*n* include corresponding feature databases 416-1 to 416-*n* to store a set of feature-points associated with the plurality of images. The set of feature-points corresponding to two images can be used to check whether the two images are similar or not. Further, the image-matching servers of the set of distributed image-matching servers 410-1 to 410-*n* include image searching modules 418-1 to 418-*n* for conducting an image based search. The image based search can be performed by using any of the image matching techniques known in the art. For one embodiment, the image-search is performed by matching a set of feature-points associated with the plurality of images and a set of feature-points extracted from the query image 102. Based on the image-search, a list of matching images corresponding to the query image 102 can be identified by one or more image-matching servers 410-1 to 410-*n* as described in conjunction with FIG. 2.

In some cases, the image searching modules 418-1 to 418-*n* might not find one or more matching images corresponding to the query image 102 while conducting the image-search within the down-scaled images stored at image databases 414-1 to 414-*n*. For such cases, the image searching modules 418-1 to, 418-*n* can search for the matching image in a plurality of normal size images (i.e. without down-scaling) corresponding to the plurality of down-scaled images. For one embodiment, all the normal size images can be stored at a single image-matching server. The down-scaled images stored at the image databases 414-1 to 414-*n* are replicated from these normal size images by a replicating module 420-1 to 420-*n*. The replicating module can be present in the single image-matching server. Further, it will be apparent to a person ordinarily skilled in the art that the storage capacity of the single image-matching server should be appropriately sized in order to store all normal sized images.

For another embodiment of the present invention, the normal size images can be stored at a set of distributed image-matching servers. Similar to the down-scaled images, these normal size images can be stored in the image databases of a plurality of image-matching servers. In this case, preferably one or more image-matching servers of the set of distributed image-matching servers 410-1 to 410-*n* will include a replicating module 420-1 to 420-*n* for creating down-scaled replicas of each normal sized image and storing it at the image database 414-1 to 414-*n*. Further, similar to forming subsets in the plurality of down-scaled images, subsets can be assigned to the plurality of normal sized images stored at the image databases of the set of distributed image-matching servers. The subsets can be assigned in a similar way as explained above in conjunction with the down-scaled images. It will be apparent to a person ordinarily skilled in the art that the set of image-matching servers used to store the normal sized images can be the image-matching servers 410-1 to 410-*n*.

The following example illustrates an application of the present invention. A user can send a query image, for example an image of a poster of movie 'X', to the query-server 104, by using a communication device, for example a hand held mobile phone with an inbuilt camera, in order to find one or more matching images. On receiving the query image, the query-server scales the query image to a predefined size, for example, 150×150 pixels. It will be apparent to a person ordinarily skilled in the art that the predefined size for downscaling a query image will depend on the practical implementation of the invention. Further, the query-server 104 sends a request to one or more image-matching servers of a set of distributed image-matching servers to conduct an image based search. The request can include either the scaled query image or a set of feature-points extracted from the query image. The image based search is conducted against a plurality of down-scaled images stored in image databases 414-1 to 414-*n*. These down-scaled images can be replicated from normal size images stored at one or more image-matching servers.

Further, as described in conjunction with FIG. 4, the image-matching servers 410-1 to 410-*n* can include predefined subsets containing a set of down-scaled images related to the query image, i.e. the poster of movie 'X'. In this case, if the poster of movie 'X' shows a sea beach, the predefined subsets can include various down-scaled images of sea beaches obtained from various sources like the Internet, magazines, billboard advertisements etc. It may also be a case that there is no subset defined for a query image. It will be apparent to a person ordinarily skilled in the art that the formation of subsets simply groups a set of images which are similar in content or context. In case a subset of down-scaled images is defined for a query image, an image-search will be conducted within the subset. However, in case the subset is not defined, the image-search will be conducted across the plurality of down-scaled images stored at image databases 414-1 to 414-*n*.

In case one or more matches are identified for the query image by one or more image-matching servers, a list of identified matches is sent to the query-server 402. The identified matches may include the image of the poster of movie 'X' that may be a rotated or zoomed version. The identified matches can also include images of the movie posters that look similar to the poster of movie 'X'. For example, if the movie 'X' is Shrek then the identified matches will include images of posters of Shrek, Shrek 2, or Shrek 3. Further, the scoring module 409 assigns a score to identified matches in the list of identified matches. A scoring function ensures that the best possible match in the list of identified matches is assigned the highest score, and similarly, other matches are ranked depending on their relevancy with respect to the query image. Based on the assigned score, the identified matches are sorted in a decreasing order of the assigned score. The best possible matching image corresponding to the poster of movie 'X' obtained through the image-search, assigned the highest score, will be on the top in the sorted list, and the images that look similar to the poster of movie 'X' will be at a lower place in the sorted list. Lastly, one or more images can be selected, for example the top three or four images from the sorted list, as a match corresponding to the poster of movie 'X'.

The present invention facilitates the query image to be matched within the image databases of a set of distributed image-matching servers, and thus, the database of images to conduct the image-search is increased. As a result of conducting the image-search in the set of distributed image-matching servers, the total number of servers for storing the image databases increases, and consequently, a greater number of reference images can be stored at the image databases for conducting the image-search. Therefore, the number of reference images against which a query image can be matched is increased. Further, preferably each image-matching server of the set of distributed image-matching servers receives the request (i.e. a query image or a set of feature-points extracted from the query image) and starts the image-search at the same time. As a result, less time is required to identify one or more matching images. Also, as explained earlier, the image-search can preferably be conducted at all the image-matching servers to identify one or more matching images, or in another scenario, when any one of the image-matching servers identifies one or more matching images, the image-search can be stopped across all the image-matching servers. Further, the feature-points corresponding to the query image are extracted at the query-server which reduces the effort for each image-matching server of the set of distributed image-matching servers to extract the feature-points, and hence, increases the throughput of the entire image matching system. In addition, the query image can be matched with the down-scaled images that are stored in the image databases, and as a result, a greater number of query images received from various users can be matched at a given time. Also, the time to identify the match is reduced a considerable amount since, in one embodiment, the image-matching server will only match the query image with the normal size images if the match is not identified within the down-scaled images stored at the image databases. Matching the feature-points of the down-scaled images is advantageous, as the down-scaled images occupy less space and therefore there is more space available for storing images from other sources in the image databases. Additionally, matching the feature-points of the down-scaled images requires less time to identify the matching images. Lastly, the predefined scoring function helps to assign a score and select one or more matches from the list of identified matches found by different image-matching servers of the set of distributed image-matching servers, and thus, multiple similar matching images, causing redundant results, can be effectively distinguished and eliminated or placed at a lower position in the list of matching images provided to the user.

The present invention can be used in fields such as computer vision, object recognition, motion tracking and 3D modeling. Image matching is a fundamental feature required in all these fields. The images may be of different formats such as Joint Photographic Experts Group (JPEG), Graphics interchange Format (GIF), Bitmap (BMP), etc. The quality and resolution of these images may vary from one application to another. Further, the images may not be exactly the same but a transformed version of each other.

The system, as described in the present invention, or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps constituting the method of the present invention.

The servers used in the image-matching system comprise a computer, an input device, and a display unit. The computers comprise a microprocessor, which is connected to a communication bus. The servers also include a memory, which may include Random Access Memory (RAM) and Read Only Memory (ROM). Further, the servers comprise a storage device, which can be a hard disk drive or a removable storage drive such as a floppy disk drive, an optical disk drive, and the like. Furthermore, the storage device can be other similar means for loading computer programs or other instructions on the servers.

To process input data, the computer system executes a set of instructions that are stored in one or more storage elements. The storage elements may also store data or other information, as desired, and may be an information source or physical memory element present in the processing machine.

The set of instructions may include various commands that instruct the processing machine to perform specific tasks such as the steps constituting the method of the present invention. The set of instructions may be in the form of a software program. The software may be in various forms such as system or application software. The software may also be in the form of a collection of separate programs, a program module with a larger program, or a portion of a program module. Further, the software may include modular programming in the form of object-oriented programming. Processing of input data by the processing machine may be in response to user commands or to the results of previous processing.

Aspects of the present disclosure can be stored as program code in hardware and/or software. As known in the art, storage media and non-transitory computer readable media for containing code, or portions of code, for implementing aspects and embodiments of the present invention can include, for example and without limitation, magnetic cassettes, magnetic tapes, floppy disks, optical disks, CD-ROMs, digital versatile disk (DVD), magnetic-optical disks, read-only memories (ROMs), random access memories (RAMs), erasable programmable ROMs (EPROMs), and electrically erasable programmable ROMs (EEPROMs).

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for image matching, the method comprising:
 receiving a query image at a query-server;
 sending a request to one or more image-matching servers of a set of distributed image-matching servers to conduct an image-search corresponding to the query image;
 receiving, at the query-server, a list of identified matches from the one or more image-matching servers corresponding to the query image, wherein the list of matches is identified based on the image-search at the one or more image-matching servers;
 assigning, at the query-server, a score to each respective identified match from the list of identified matches based at least in part on an extent of matching between the respective identified match and the query image;
 selecting one or more matches from the list of identified matches based on the assigned scores;
 replicating a down-scaled form of a plurality of images;
 storing the plurality of replicated images and a set of feature-points associated with the plurality of replicated images at an image database and a feature database, of the one or more image-matching servers of the set of distributed image-matching servers respectively; and
 assigning a subset of the replicated images to the image database of the one or more image-matching servers, wherein the subset is selected based on one or more of:
  i. a number of query images received corresponding to a particular set of images; and
  ii. a total number of images stored in the image databases of the image-matching servers.

2. The method of claim 1 further comprising scaling the query image at the query-server to a predefined size prior to sending the request to the one or more image-matching servers of the set of distributed image-matching servers.

3. The method of claim 1, further comprising extracting a set of feature-points associated with the query image.

4. The method of claim 3, wherein the set of feature-points associated with the query image is extracted at the query-server prior to sending the request to the one or more image-matching servers of the set of distributed image-matching servers.

5. The method of claim 3, wherein the set of feature-points associated with the query image is extracted at the one or more image-matching servers of the set of distributed image-matching servers prior to the image-search at the image-matching servers.

6. The method of claim 1, wherein the image-search is based on matching a set of feature-points extracted from the query image with the set of feature-points associated with the plurality of replicated images stored at the one or more image-matching servers of the set of distributed image-matching servers.

7. The method of claim 1, wherein selecting one or more matches from the list of identified matches comprises sorting the list of identified matches in a decreasing order of the assigned scores.

8. The method of claim 1, wherein the request comprises the query image.

9. The method of claim 1, wherein the request comprises a set of feature-points extracted from the query image.

10. A server comprising:
 a receiver for receiving a query image;
 an extracting module for extracting a set of feature-points from the query image;
 a split module for sending a request to one or more image-matching servers of a set of distributed image-matching servers to conduct an image-search; and
 a merge module configured to:
  i. receive a list of identified matches corresponding to the query image from the one or more image-matching servers, wherein the list of matches is identified based on the image-search at the one or more image-matching servers;
  ii. assign a score to each respective identified match from the list of identified matches based at least in part on an extent of matching between the respective identified match and the query image;
  iii. select one or more matches from the list of identified matches based on the assigned scores;
  iv. replicate a down-scaled form of a plurality of images;
  v. store the plurality of replicated images and a set of feature-points associated with the plurality of replicated images at an image database and a feature database, of the one or more image-matching servers of the set of distributed image-matching servers respectively;
vi. assign a subset of the replicated images to the image database of the one or more image-matching servers, wherein the subset is selected based on one or more of:
a number of query images received corresponding to a particular set of images; and
a total number of images stored in the image databases of the image-matching servers.

11. A system comprising:
a query-server and a set of distributed image-matching servers;
the query-server comprising:
 a. a receiver for receiving a query image;
 b. a split module for sending a request to one or more image-matching servers of the set of distributed image-matching servers to conduct an image-search;
 c. a merge module configured to:
  i. receive a list of identified matches corresponding to the query image from the one or more image-matching servers, wherein the list of matches is identified based on the image-search at the one or more image-matching servers;
  ii. assign a score to each respective identified match from the list of identified matches based at least in part on an extent of matching between the respective identified match and the query image; and
  ii. select one or more matches from the list of identified matches based on the assigned scores; and
 d. a replicating module configured to:
  i. replicate a down-scaled form of a plurality of images;
  ii. store the plurality of replicated images and a set of feature-points associated with the plurality of replicated images at an image database and a feature database, of the one or more image-matching servers of the set of distributed image-matching servers respectively; and
  iii. assign a subset of the replicated images to the image database of the one or more image-matching servers, wherein the subset is selected based on one or more of:
   a number of query images received corresponding to a particular set of images; and
   a total number of images stored in the image databases of the image-matching servers; and
the set of distributed image-matching servers comprising extracting modules for extracting feature-points from the query image.

12. The system of claim 11, wherein the one or more image-matching servers of the set of distributed image-matching servers further comprise an image searching module for matching a set of feature-points extracted from the query image with the set of feature-points associated with the plurality of replicated images stored in the feature database.

13. A computer program product for use with a computer, the computer program product comprising instructions stored in a non-transitory computer readable medium having a computer readable program code embodied therein for image matching, the computer readable program code comprising:
 a. program instructions for receiving a query image at a query-server;
 b. program instructions for sending a request to one or more image-matching servers of a set of distributed image-matching servers to conduct an image-search corresponding to the query image;
 c. program instructions for receiving, at the query-server, a list of identified matches corresponding to the query image from the one or more image-matching servers, wherein the list of matches is identified based on the image-search at the one or more image-matching servers;
 d. program instructions for assigning a score to each respective identified match from the list of identified matches based at least in part on an extent of matching between the respective identified match and the query image;
 e. program instructions for selecting one or more matches from the list of identified matches based on the assigned scores;
 f. program instructions for replicating a down-scaled form of a plurality of images;
 g. program instructions for storing the plurality of replicated images and a set of feature-points associated with the plurality of replicated images at an image database and a feature database, of the one or more image-matching servers of the set of distributed image-matching servers respectively; and
 h. program instructions for assigning a subset of the replicated images to the image database of the one or more image-matching servers, wherein the subset is selected based on one or more of:
  i. a number of query images received corresponding to a particular set of images; and
  ii. a total number of images stored in the image databases of the image-matching servers.

* * * * *